United States Patent [19]

Ishida et al.

[11] 4,333,620
[45] Jun. 8, 1982

[54] TAPE CASSETTE

[75] Inventors: Toshihiko Ishida; Kimio Tanaka, both of Tokyo, Japan

[73] Assignee: TDK Electronics Co., Ltd., Tokyo, Japan

[21] Appl. No.: 131,817

[22] Filed: Mar. 19, 1980

[30] Foreign Application Priority Data

Mar. 19, 1979 [JP] Japan .............................. 54-35449[U]

[51] Int. Cl.³ .......................... G03B 1/04; G11B 15/32
[52] U.S. Cl. .................................................... 242/199
[58] Field of Search .............................. 242/197–199; 206/389; 360/93, 96, 132

[56] References Cited

U.S. PATENT DOCUMENTS 3,923,272  12/1975  Pertzsch et al. .................... 242/199
3,977,626   8/1976  Gaiser et al. ........................ 242/199

Primary Examiner—Leonard D. Christian
Attorney, Agent, or Firm—Oblon, Fisher, Spivak, McClelland & Maier

[57] ABSTRACT

A tape cassette including a pair of plates having a pair of bent portions each for holding magnetic tape and reel hubs on which the magnetic tape is wound. A plurality of cut portion are formed in each of the bent portions for defining portions facing the reel hubs, such portions projecting toward the reel hubs so as to be in contact with the reel hubs.

4 Claims, 5 Drawing Figures

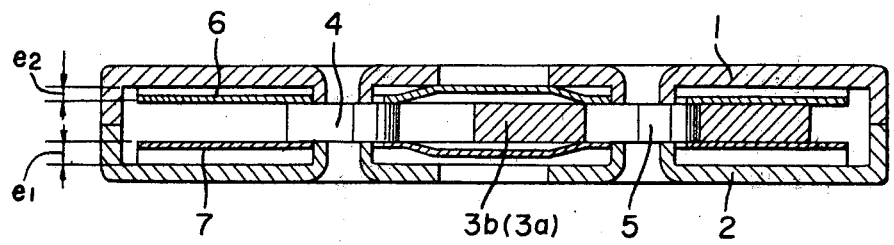
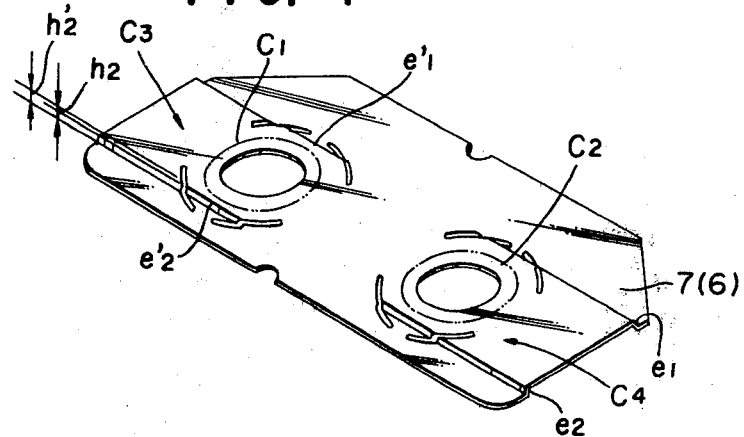
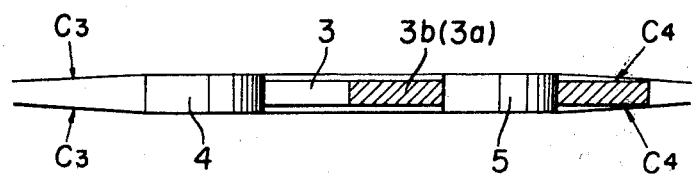

TAPE CASSETTE

BACKGROUND OF THE INVENTION

Field of the Invention

The present invention relates to a tape cassette. More particularly, it relates to a structure of plates positioned in a pair of half casings of the tape cassette to hold a magnetic tape and reel hubs on which the magnetic tape is wound.

FIG. 6 shows a plate proposed to overcome the disadvantage of the plate shown in FIG. 5. The aim of the proposal in Figure is to control the positions of a pair of reel hubs (4), (5) and the magnetic tape by forming bent portions $b_1$, $b_2$ in the area of the radius of gyration for the reel hubs (4), (5). However, difficulty has been encountered with this conventional plate in maintaining the evenness of the positions and the height of the bent portions $b_1$, $b_2$ thus easily causing a difference of the height between the bent portions $b_1$, $b_2$. It has been found that the winding operation of the magnetic tape becomes unstable because of the inclination of the reel hubs (4), (5) caused by the difference in the height of the step resulting in a remarkable loss of effectiveness in regulating the shape of the wound portion.

SUMMARY OF THE INVENTION

It is an object of the present invention to overcome the disadvantages of the conventional tape cassette and to provide an improved tape cassette which is free from any rattling movement of the reel hubs thereby preventing abnormal sound during the running of the magnetic tape and which reduces the difference in the height of the step caused by the winding of the tape to regulate the shape of the wound portion of the magnetic tape.

The foregoing and other objects of the present invention have been attained by providing a tape cassette including a magnetic tape, reel hubs for winding the magnetic tape and a pair of plates fitted in the tape cassette so as to hold the magnetic tape and the reel hubs wherein the plates are provided with cut portions which are formed to define portions in contact with the reel hubs and to project toward the reel hubs.

BRIEF DESCRIPTION OF THE DRAWINGS

FIG. 3 is an enlarged sectional view in assembled state of the tape cassette of the present invention;

FIG. 4 is a schematic view of an embodiment of a plate of the present invention; and FIG. 5 is a schematic view in assembled state of the main part of the tape cassette of the invention in which another embodiment of plates is used.

The same reference numerals designate the same or corresponding parts throughout the several views.

DETAILED DESCRIPTION OF THE PREFERRED EMBODIMENTS

Figure 1:
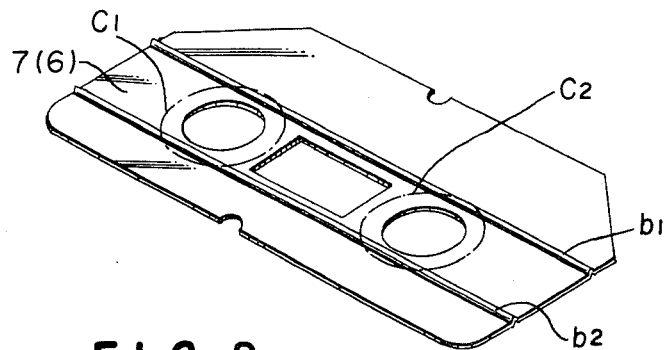
FIG. 1 is a schematic view of a conventional plate.
Figure 2:
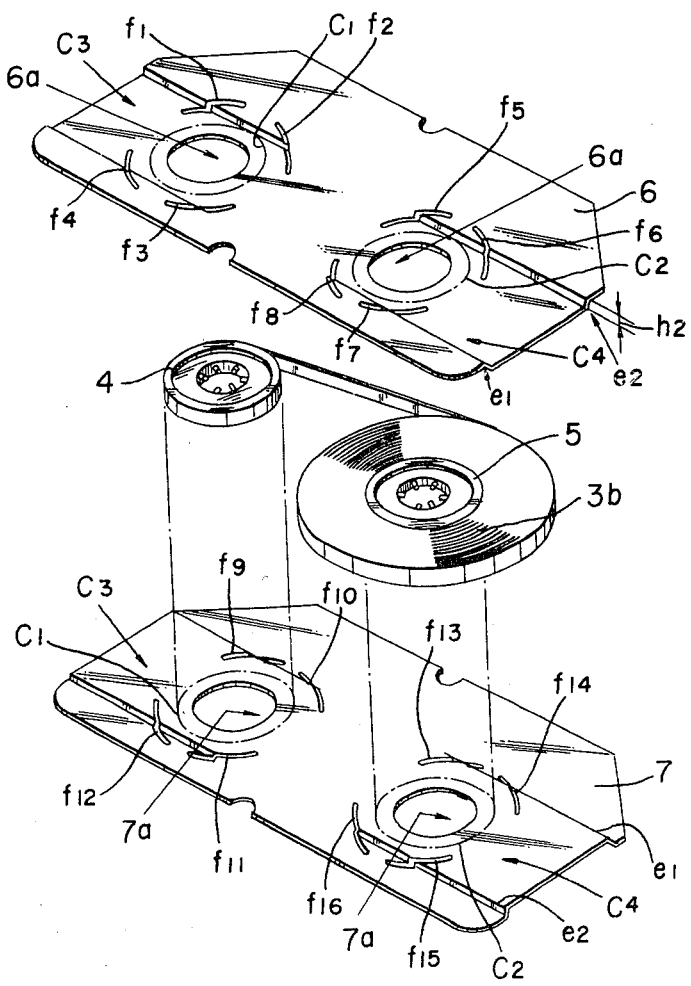
FIG. 2 is a schematic view in the disassembled state of an embodiment of the main part of a tape cassette of the present invention.

The present invention will be described by certain specific examples, which are included for the purpose of illustration and are not intended to be limiting unless otherwise specified.

FIG. 7 is a schematic view in the disassembled state of the main part of a tape cassette of the present invention and FIG. 8 is a sectional view in assembled state of the tape cassette. In the embodiment, linear bent portions $e_1$ and $e_2$ are respectively formed in transparent plates (6) and (7) to project toward the contacting surfaces in contact with the reel hubs (4) and (5) so as to form a step $h_2$ at the outside of the radial portion of the contacting portions $C_1$ and $C_2$ in contact with the reel hubs (4), (5) and circular arc shaped cut portions ($f_1$) to ($f_{16}$) are formed outside the contacting portions $C_1$, $C_2$ traversing the bent portions $e_1$, $e_2$. The plates (6), (7) are made of material such as graphite-polyfluoroethylene, polyfluoroethylene, polyester or polyethylene and the bent portions $e_1$, $e_2$ can easily be formed by applying a pressing process.

When these bent portions $e_1$, $e_2$ are formed, elasticity is imparted to the area of the contacting portions $C_1$, $C_2$ in contact with the reel hubs which are surrounded by the cut portions ($f_1$) to ($f_{16}$). Accordingly, in the assembled state as shown in FIG. 8, the reel hubs (4), (5) are held between the pair of half casings (1), (2) of the tape cassette under the spring action of the plates (6), (7) thereby preventing the rattling movement. This arrangement prevents the contact of the reel hubs with the half casings (1), (2) so that abnormal sound caused by the contacting is substantially prevented during the winding operation. Further, the reel hubs (4), (5) are held in the same height level at the central portion of the half casings (1), (2) so that the magnetic tape (3) can be wound keeping substantially the same level. As a result, the deviation of the surface of the wound portion (3b) of the magnetic tape to the surface of the reel hubs (4), (5) can be minimized thereby preventing the problems of stopping of the winding operation caused by the increasing of the friction torque and breaking of the edge of the magnetic tape.

Elasticity is also imparted to contact portions $C_3$ and $C_4$ in contact with the wound portion of the magnetic tape formed around the cut portions ($f_1$) to ($f_{16}$) as well as the contacting portions $C_1$, $C_2$ in contact with the reel hubs so that the magnetic tape is elastically wound on the reel hub (4) or (5). Accordingly, the shape of the wound portion (3b) or (3a) of the magnetic tape can be regulated whereby the problems of stopping of the winding operation caused by the increase of the friction torque and breaking of the edge of the magnetic tape can substantially be prevented.

The contacting portions $C_1$, $C_2$ in contact with the reel hubs are distinguished from the contacting portions $C_3$, $C_4$ in contacting with the wound portion of the magnetic tape by the provision of the cut portions ($f_1$) to ($f_{16}$). Accordingly, it is easy to make the height of the step of the bent portions $e_1$, $e_2$ at the contacting portion $C_1$, $C_2$ different from the height of the step of those at the contacting portions $C_3$, $C_4$ respectively so as to impart the optimum pressing force to the reel hubs (4), (5) and the magnetic tape (3). That is, it is possible to wind the magnetic tape (3) on the reel hubs (4), (5) under the condition of the application of the optimum pressing force by applying different pressing forces to the wound portion (3b) or (3a) of the magnetic tape and the reel hubs (4) or (5) respectively. This is attained as follows: a large step is formed for the bent portions of the contacting portions $C_1$, $C_2$ in contact with reel hubs which have a small rotating-radius to cause a large torque, whereas a small step is formed for the bent portions of the contacting portions $C_3$, $C_4$ in contact with the wound portion of the magnetic tape which have a large rotating radius to cause a large torque.

FIG. 9 is a schematic view of a plate in which the height of a step $h'_2$ of the bent portions $e'_1$, $e'_2$ in the contacting portions $C_1$, $C_2$ in contact with the reel hubs and the height of the step $h_2$ of the bent portions $e_1$, $e_2$ in the contacting portions $C_3$, $C_4$ in contact with the magnetic tape are determined to give $h'_2 > h_2$ from the viewpoint of the above description.

As shown in FIG. 10, when the cut portions ($f_1$) to ($f_{16}$) are formed in the bent portions $e_1$, $e_2$, the contacting portions $C_3$, $C_4$ in contact with the wound magnetic tape are curved to surround the reel hubs (4), (5) and the magnetic tape (3) at the cut portions ($f_1$),($f_4$); ($f_6$),($f_7$); ($f_9$),($f_{12}$) and ($f_{14}$),($f_{15}$), thereby providing a highly regulated shape of the wound portion (3b) or (3a) of the magnetic tape by cushion effect.

As stated above, the cut portions ($f_1$) to ($f_{16}$) of the bent portions $e_1$, $e_2$ are highly effective in that a suitable pressing force is imparted to the reel hubs (4), (5) and the magnetic tape (3) to control them so as to prevent abnormal sound and to regulate the shape of the wound portion of the magnetic tape thereby preventing the breaking of the edge. However, if the height of the step $h_2$ of the bent portions $e_1$, $e_2$ is too large, the friction torque caused by the revolution becomes large and might cause the stopping of the winding operation. Accordingly, it is necessary to determine the height of the step of the bent portions $e_1$, $e_2$ so as to prevent such an accident. Table 1 shows a result of an experiment in which the relation of the height of the step $h_2$ at the contacting portions $C_3$, $C_4$ in contact with the wound portion of the magnetic tape to a number of stoppings of the winding operation in tape cassettes and the evaluation of the shape of the wound portion are shown.

TABLE 1

| Height of step $h_2$ | Torque required for winding | Number of stoppings of running | Evaluation of shape |
| --- | --- | --- | --- |
| 0.5–0.65 mm | 16–25 gr.cm | eight to ten | Excellent |
| 0.2–0.5 mm | 10–15 gr.cm | zero to twenty | " |
| 0 (no step) | 8–11 gr.cm | four to ten | No good |

As is appreciated from Table 1, when the height of the step $h_2$ is in the range of about 0.2 to 0.5 mm, the number of stoppings of the winding operation is zero and evaluation for the shape of the wound portion of the magnetic tape is given as excellent. Accordingly, it is most preferable to determine the height of the step $h_2$ in the range from 0.2 to 0.5 mm. Certain types of tape decks and tape recorders having a winding torque of about 20 gr. cm. In this case, when the height of step $h_2$ exceeds 0.5 mm, the torque required for the winding can not be provided, resulting in the twisting of the magnetic tape around a pinch roller or the flying of the tape out of the cassette.

The height of the step $h_2$ in Table 1 means the height of step of the bent portions $e_1$, $e_2$ in the contacting portions $C_3$, $C_4$ in contact with the wound magnetic tape. Even though the bent portions in the contacting portions $C_1$, $C_2$ in contact with the wound portion of the magnetic tape have also the height of the step, the increasing or the decreasing of the friction torque caused by the revolution also depends on the height of the step $h_2$ of the bent portions $e_1$, $e_2$ in the contacting portions $C_3$, $C_4$ in contact with the wound portion of the magnetic tape. However, it should be noted that the height of the step of the contacting portions $C_1$, $C_2$ in contact with the reel hubs is important for preventing the rattling movement of the reel hubs (4), (5). Table 2 shows the relation of the height of the step of the bent portions in the contacting portions $C_1$, $C_2$ in contact with the reel hubs to an acoustic evaluation of the abnormal sound produced during the rapid winding of the magnetic tape.

TABLE 2

| Height of step | Evaluation of produced sound |
| --- | --- |
| 0.5 mm | Excellent |
| 0.3 mm | Good |
| 0.1 mm | No good |
| 0 | No good |

As stated in Table 2, when the height of the step is less than 0.1 mm, a rattling sound is produced by the contacting of the reel hubs to the half casings to be no good in the acoustic evaluation. On the other hand, when the height of the step is 0.5 mm, no abnormal rattling sound occurs to be excellent in the acoustic evaluation. Accordingly, it is most preferable to determine the height of the step to be about 0.5 mm.

As stated above, the tape cassette of the present invention includes the magnetic tape, the reel hubs on which the magnetic tape is wound and the plates positioned in the half casings to hold the magnetic tape and the reel hubs wherein the plates are provided with cut portions at a part of the bent portions which are formed to define the portion facing and projecting to the reel hubs. Accordingly, the rattling movement of the reel hubs does not occur to prevent the abnormal sound during the winding operation, the irregularity of the surface of the wound portion is minimized; and thus the shape of the wound portion of the magnetic tape can be regulated so that a highly reliable tape cassette can be attained.

What is claimed as new and desired to be secured by Letters Patent of the United States is:

1. A tape cassette comprising:
    first and second half casings connected together;
    a magnetic tape mounted within said first and second half casings;
    first and second reel hubs for winding the magnetic tape;
    first and second plates for holding the reel hubs and the magnetic tape in said first and second half casings, said first and second plates including a pair of bent portions defining portions in contact with the reel hubs, said bent portions having a plurality of cut portions extending therethrough which surround said first and second reel hubs.

2. A tape cassette according to claim 1, wherein the bent portions are positioned radially outside of the portions in contact with the reel hubs and the cut portions comprise arcuate cut portions arranged in a circular array which surround the portions contacting the reel hubs.

3. A tape cassette according to claim 1, said first and second plates comprising portions in contact with said tape wherein the height of said bent portions at said portions in contact with the reel hubs is greater than the height of the bent portions at said portions in contact with said tape.

4. A tape cassette according to claim 1, wherein the height of said bent portions at the portions contacting the tape is in the range of 0.2 to 0.5 mm.

* * * * *